(12) United States Patent
Tanaka et al.

(10) Patent No.: US 6,736,548 B2
(45) Date of Patent: May 18, 2004

(54) OPTICAL FIBER CONNECTOR PLUG PROTECTING CAP

(75) Inventors: Kiyoshi Tanaka, Chiba (JP); Yuukou Hata, Chiba (JP)

(73) Assignee: Seiko Instruments Inc., Chiba (JP)

( * ) Notice: Subject to any disclaimer, the term of this patent is extended or adjusted under 35 U.S.C. 154(b) by 70 days.

(21) Appl. No.: 10/164,050

(22) Filed: Jun. 6, 2002

(65) Prior Publication Data

US 2003/0002815 A1 Jan. 2, 2003

(30) Foreign Application Priority Data

Jun. 29, 2001 (JP) ........................................ 2001-198111

(51) Int. Cl.⁷ ............................... G02B 6/36; G02B 7/00
(52) U.S. Cl. .......................................... 385/78; 385/139
(58) Field of Search ............................. 385/76–78, 134, 385/139

(56) References Cited

U.S. PATENT DOCUMENTS 5,202,949 A * 4/1993 Hileman et al. ............. 385/134
6,227,717 B1 * 5/2001 Ott et al. ..................... 385/139

FOREIGN PATENT DOCUMENTS

JP           06231639  A  *  8/1994  ............ H01B/17/38
JP           2000258661 A  *  9/2000  ............ G02B/6/38

* cited by examiner

Primary Examiner—Hemang Sanghavi
Assistant Examiner—Omar Rojas
(74) Attorney, Agent, or Firm—Adams & Wilks (57) ABSTRACT

An optical fiber connector plug protecting cap is configured to be mounted to an optical fiber connector plug having a ferrule with an insertion hole into which an optical fiber is inserted and a holding member for holding the ferrule. The optical fiber connector plug protecting cap has a tubular cap member made of a resin material and configured to be fitted to a tip opening of the holding member to cover a tip portion of the ferrule in a non-contacting state, and a strap member having first and second end portions and comprised of an elastic body having a relatively greater flexibility than the cap member. The cap member has a connecting part having a locking hole for locking the first end portion of the strap member. The first end portion of the strap member has an engagement protrusion for engagement with the locking hole in a state in which the first end portion extends through the locking hole. The engagement protrusions of the strap member has a deformable portion configured to be deformed so that the engagement protrusions is locked to an edge portion of the connecting part of the cap member near the locking hole.

9 Claims, 7 Drawing Sheets

OPTICAL FIBER CONNECTOR PLUG PROTECTING CAP

BACKGROUND OF THE INVENTION

1. Field of the Invention

The present invention relates to an optical fiber connector plug protecting cap (hereafter, referred to as protecting cap) for protecting a ferrule end face of an optical fiber connector plug.

2. Description of the Related Art

Hitherto, in case where an optical fiber is fixed to a ferrule attached to an optical fiber connector plug, the optical fiber is bonded/fixed to the optical fiber connector plug by pouring a thermosetting adhesive into the optical fiber connector plug, then inserting the optical fiber whose coating has been peeled over a certain length, and heating/hardening the adhesive by a heater. After the optical fiber has been bonded/fixed, the optical fiber connector plug is used by smoothly polishing a ferrule end face and an optical fiber end face to mirror finish. If the polished faces, of the ferrule and the optical fiber, having been subjected to the polish finish are injured, when the ferrules are oppositely connected each other, an opposed position accuracy is deteriorated, so that a loss becomes large. Therefore, for the purpose of protecting the ferrule end face and the optical fiber end face after the polish finish, there has been known a protecting cap fitting to a tip portion of the optical fiber connector plug and formed by rubber, plastic and the like.

Figure 7A:
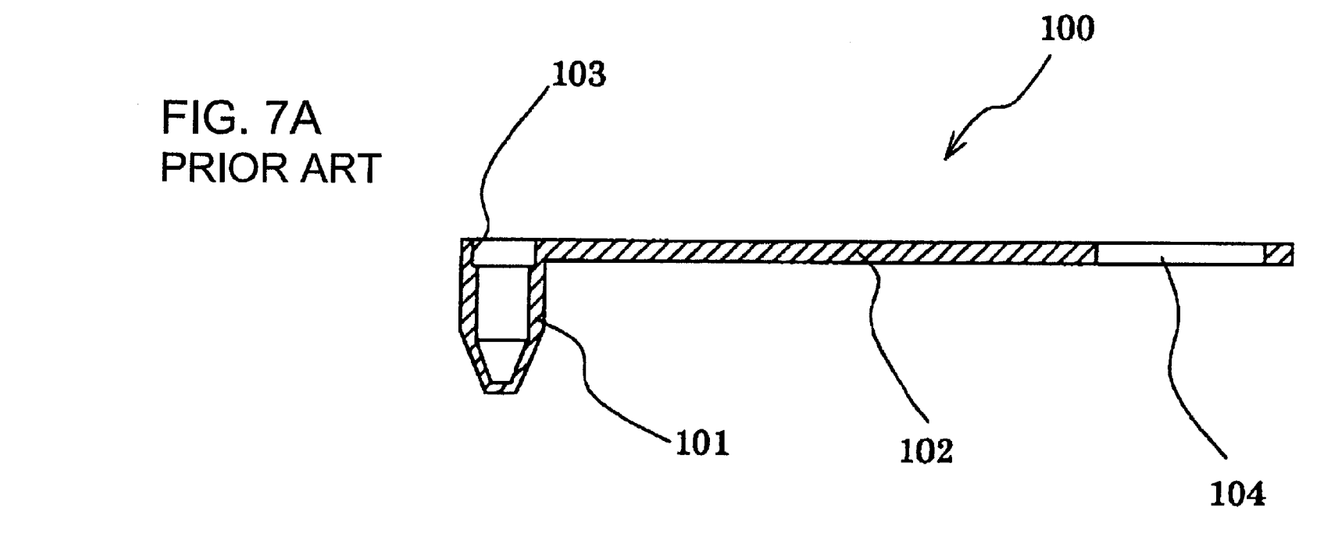
FIG. 7A is a sectional view of a cap with strap according to the prior art.
Figure 7B:
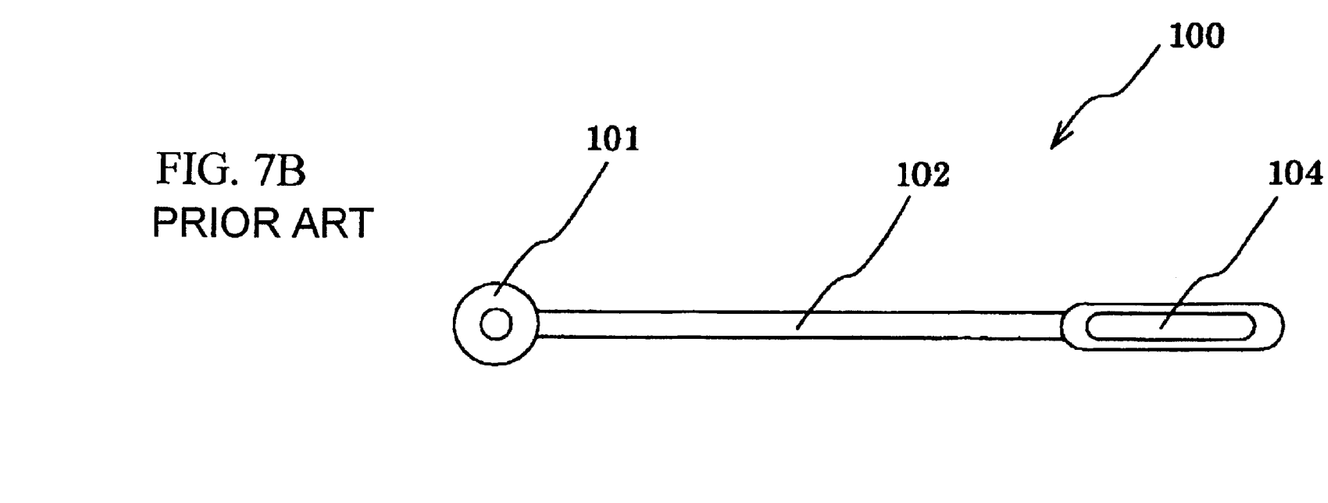
FIG. 7B is a plan view of the same.

As such a protecting cap, there has been proposed a cap 100 with a strap for an FC type optical fiber connector as shown in FIG. 7A and FIG. 7B. Incidentally, FIG. 7A is a sectional view of the cap with a strap according to the prior art, and FIG. 7B a plan view of the same.

In the cap 100 with a strap, a cap portion 101 and a strap portion 102 are integrally molded. The cap portion 101 has an engagement hole 103 engaging with an outer periphery of a plug housing of the FC type optical fiber connector (not shown). The engagement hole 103 has a shape in which its diameter gradually decreases toward a tip of the cap portion 101. The cap portion 101 is mounted so as to cover the ferrule protruding from a tip of the plug housing. Further, in the strap portion 102 molded integrally with the cap portion 101, at its tip portion in a side opposite to the cap portion 101 there is provided a passage hole 104 for the purpose of being mounted to an optical fiber cord of the FC type optical fiber connector, so that it is adapted such that the cap portion 101 itself is not disconnected from the optical fiber cord. As a material for the cap 100 with a strap, polyvinyl chloride and rubber have been used.

However, with the conventional protecting cap, since the cap portion and the strap portion are integrally molded, the cap portion where a comparatively high hardness is demanded and the strap portion where a flexibility in some extent is demanded become the same material, so that there has been a problem that characteristics of any one of the cap portion and the strap portion are sacrificed.

Further, since the conventional cap with a strap is integrally molded in a state having the strap, there is a problem that the number of products obtained in a mold cannot be increased.

SUMMARY OF THE INVENTION

In view of the forgoing drawbacks in the conventional art, according to the invention, there is provided an optical fiber connector plug protecting cap whose manufacturing time can be remarkably shortened, whose manufacturing cost can be reduced, and in which an optimum material can be selected for both of the cap portion and the strap portion.

A 1st mode of the invention solving the problem in the conventional art is an optical fiber connector plug protecting cap adapted to be mounted to an optical fiber connector plug comprising an ferrule to which an optical fiber is insertion-mounted and a holding member for holding the ferrule. The optical fiber connector plug comprises a resin-made cap member fitted to a tip opening of the holding member and covering a tip portion of the ferrule in a non-contacting state, and a strap member consisting of an elastic body relatively having more flexibility than the cap member. The cap member is provided with a lock hole for locking one end portion of the strap member in an insertion state. The one end portion of the strap member is provided with an engagement protrusion engaging with the lock hole in a state that the one end portion has been passed through the lock hole to thereby make it engageable, and that an end portion side from the engagement protrusion of the strap member becomes a pinching portion capable of being pinched in order that the engagement protrusion is locked to an outer edge portion of the lock hole.

A 2nd mode of the invention is an optical fiber connector plug protecting cap characterized in that, in the 1st mode, the other end portion of the strap member is provided with a passage hole for passing the optical fiber coated.

A 3rd mode of the invention is an optical fiber connector pug protecting cap characterized in that, in the 1st or 2nd mode, at a side opposite to the end portion side of the engagement protrusion of the strap member there is provided an abutting portion which abuts against the outer edge portion of the lock hole.

A 4th mode of the invention is an optical fiber connector plug protecting cap characterized in that, in any of the 1st-3rd modes, the lock hole is provided in an end portion of the cap member at a side opposite to an insertion side of the ferrule.

A 5th mode of the invention is an optical fiber connector plug protecting cap characterized in that, in the 4th mode, the lock hole is formed in a protrusion portion whose cross-section is smaller than that of the cap member.

A 6th mode of the invention is an optical fiber connector plug protecting cap characterized in that, in any of the 1st-5th modes, at least one surface of the pinching portion is provided with a slip prevention portion.

A 7th mode of the invention is an optical fiber connector plug protecting cap characterized in that, in any of the 1st-6th modes, a thin-walled portion is provided between the pinching portion and the engagement protrusion.

An 8th mode of the invention is an optical fiber connector plug protecting cap characterized in that, in any of the 1st-7th modes, the strap member consists of elastomer or rubber.

A 9th mode of the invention is an optical fiber connector plug protecting cap characterized in that, in any of the 1st-8th modes, the optical fiber connector plug is any of an FC type, an SC type, an LC type and an MU type.

In the invention, since the protecting cap is divided into the cap member and the strap member, an optimum material can be used for each of the cap member and the strap member. Further, it can be use only as the cap member.

DETAILED DESCRIPTION OF THE PREFERRED EMBODIMENTS

Hereunder, the invention is described on the in detail on the basis of embodiments.

First, a structure of an optical fiber connector plug to which a protecting cap of their invention is mounted is described. Incidentally, FIG. 1A is a partial sectional view of an optical fiber connector plug to which the protecting cap of the invention is mounted, and FIG. 1B a main portion enlarged view of the same.

(Embodiment 1)

Figure 1A:
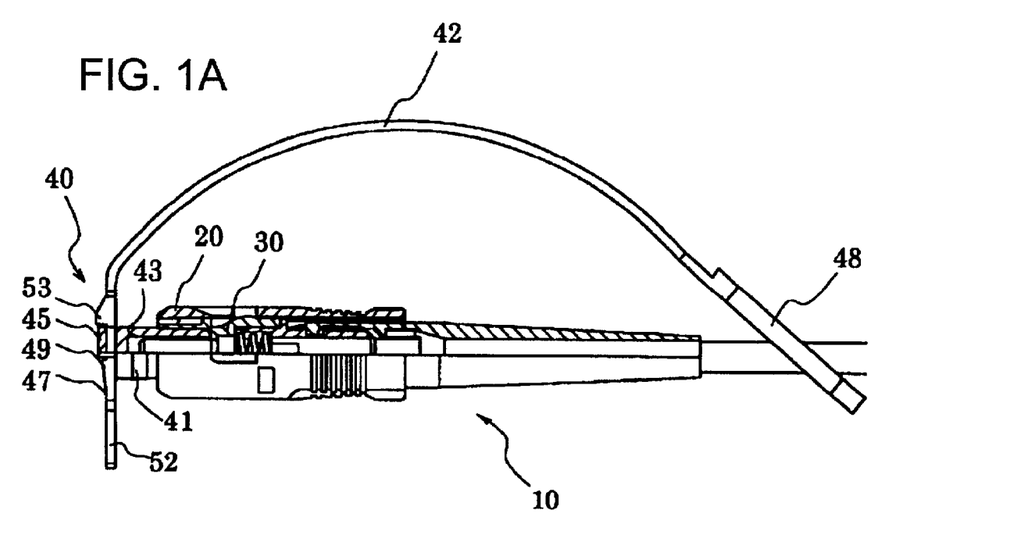
FIG. 1A is a partial sectional view of an optical fiber connector plug to which a protecting cap according to an embodiment 1 of the invention is mounted.

As shown in FIG. 1A, an optical fiber connector plug is an SC type optical fiber connector plug 10. The SC type optical fiber connector plug 10 comprises an SC type plug housing 20 fitted to an SC type optical connector adapter (not shown), and an Sc type plug frame 30 fitted into the SC type plug housing 20. As further described below in detail, a protecting cap 40 of the invention is fitted to a tip opening of the SC type optical fiber connector plug 10.

Figure 1B:
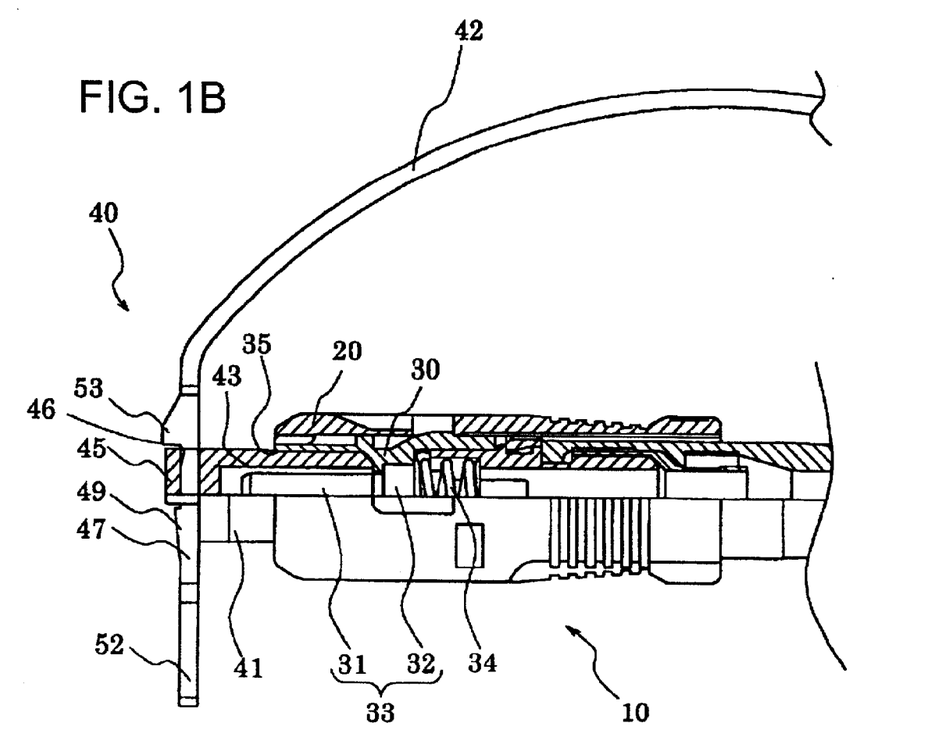
FIG. 1B is a main portion enlarged view of the same.

As shown in FIG. 1B, within the SC type plug frame 30 there are held a ferrule 33 consisting of a collar member 32 and a ferrule cylindrical body 31 for holding an optical fiber, and a compression spring 34 held on an outer periphery of a rear end portion of the collar member 32.

Such an SC type plug frame assembly is assembled by inserting in order the ferrule 33 in which the optical fiber is held in the SC type plug frame 30, and the compression spring 34. And, after the assembly, the SC type plug frame 30 has a ferrule insertion hole 35 penetrating through in a longitudinal direction. The ferrule 33 protrudes in the ferrule insertion hole 35. Additionally, the SC type optical fiber connector plug 10 is obtained by inserting this SC type plug frame assembly into the SC type plug housing 20.

The protecting cap 40 is fitted into the ferrule insertion hole 35 of the SC type optical fiber connector plug 10, thereby protecting a tip of the ferrule 33 is a non-contacting state.

Figure 2A:
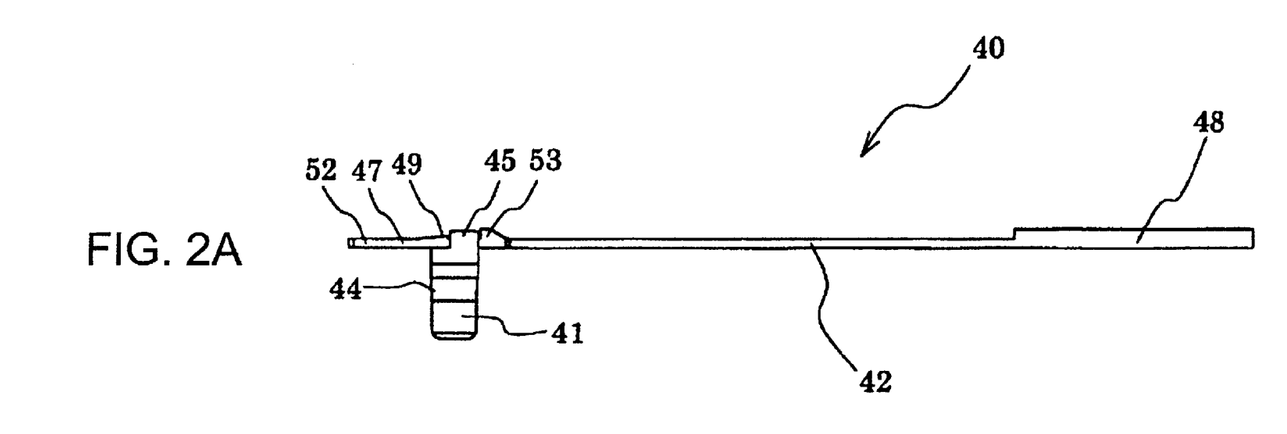
FIG. 2A is a side view of the protecting cap according to the embodiment 1 of the invention.
Figure 3A:
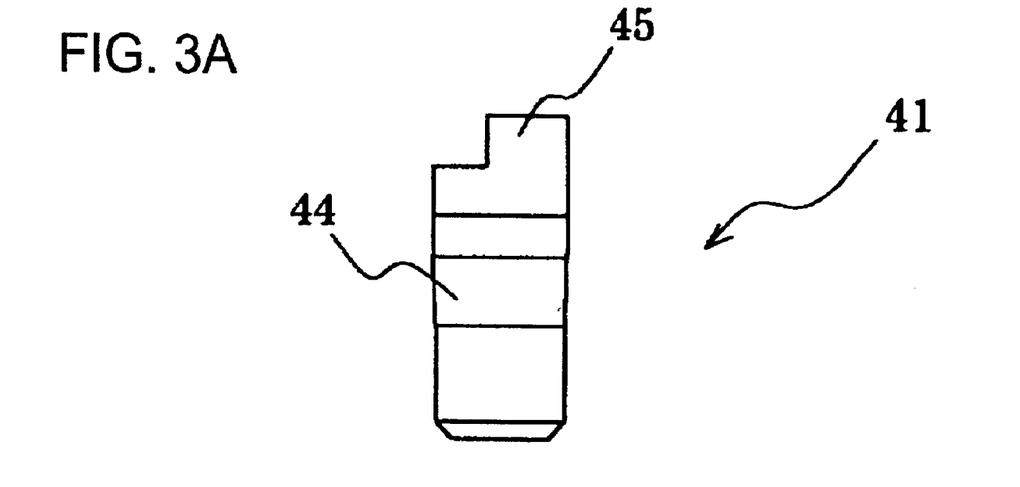
FIG. 3A is a plan view of a cap member according to the embodiment 1 of the invention.
Figure 3B:
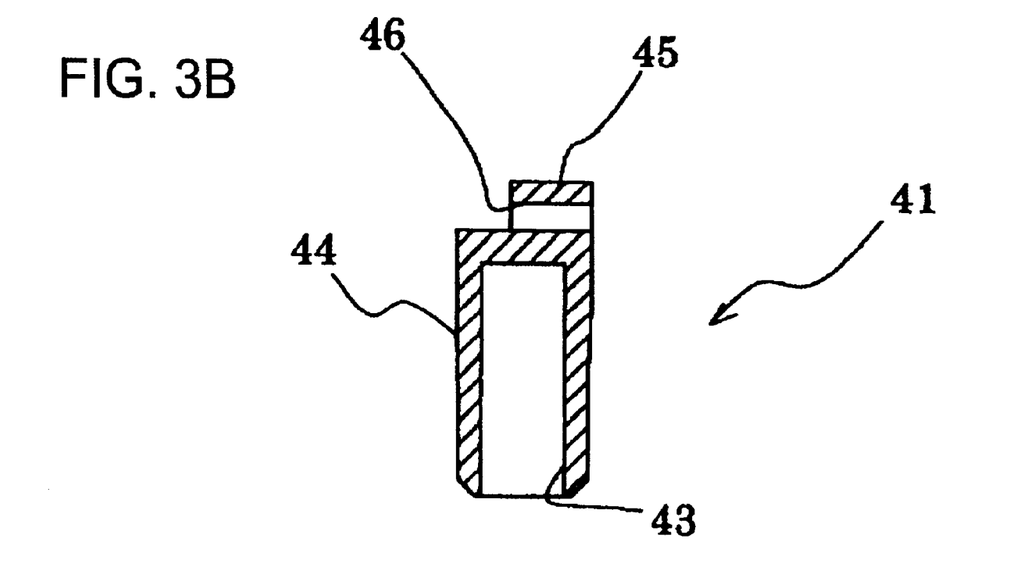
FIG. 3B is a sectional view of the same.
Figure 4A:
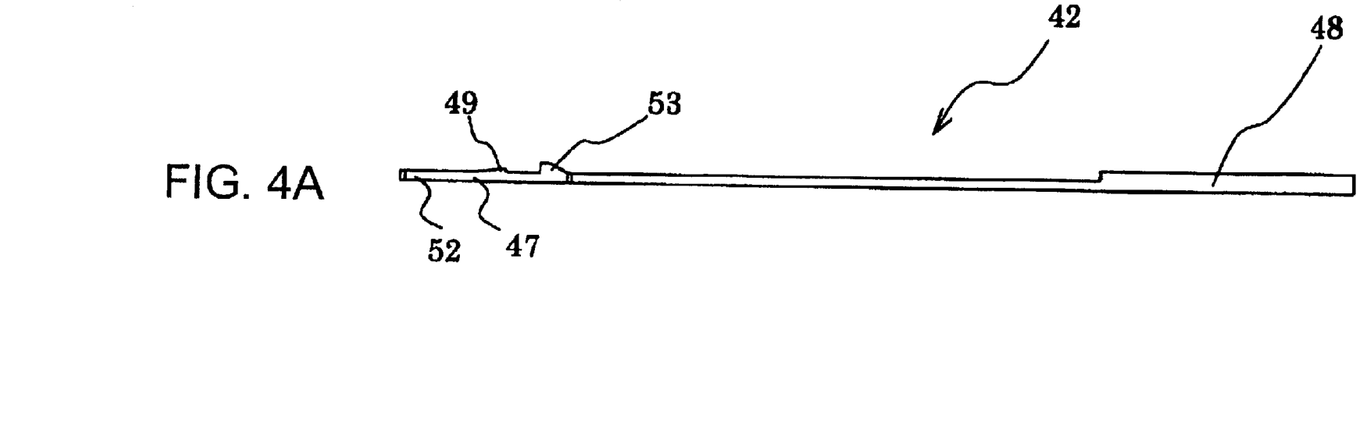
FIG. 4A is a side view of a strap member according to the embodiment 1 of the invention.

Hereunder, the protecting cap 40 fitted to the SC type optical fiber connector plug 10 is described in detail. Incidentally, FIG. 2A is a side view of the protecting cap according to this embodiment, and FIG. 2B a plan view of the same. Further, FIG. 3A is a plan view of the cap member according to this embodiment, and FIG. 3B is a sectional view of the same. FIG. 4A is a side view of a strap member according to this embodiment, and FIG. 4B a plan view of the same.

Figure 2B:
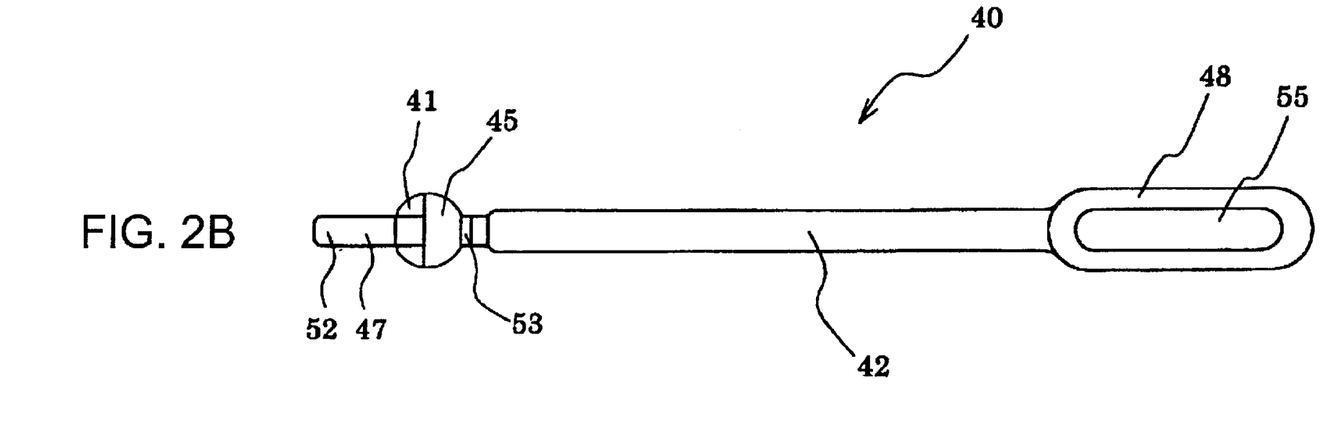
FIG. 2B is a plan view of the same.

As shown in FIG. 2A and FIG. 2B, the protecting cap 40 of this embodiment is composed of a resin-made cap member 41 fitted to the ferrule insertion hole 35 of the SC type plug frame 30 and covering the ferrule 33 in the non-contacting state, and of a strap member 42 which consists of an elastic body relatively having more flexibility than the cap member 41 and which is locked to the cap member 41 in a state that its tip is protruded by a predetermined amount.

As shown in FIG. 3A and FIG. 3B, the cap member 41 is provided with an engagement hole 43 covering, in the non-contacting state, the ferrule 33 which has an outer diameter fitting into the ferrule insertion hole 35 that is a tip opening of the SC type optical fiber connector plug 10 and which, in a state that it is fitted in the ferrule insertion hole 35, protrudes into the ferrule insertion hole 35.

The engagement hole 43 has an inner diameter larger than the outer diameter of the ferrule 33 in order that, in a state that the cap member 41 is fitted into the ferrule insertion hole 35, it is held in a state non-contacting with the ferrule 33, and it has a sufficient depth.

Further, an outer peripheral face of the cap member 41 becomes a taper portion 44 for fitting the cap member 41 into the ferrule insertion hole 35 at a constant position.

The taper portion 44 is provided on an outer peripheral face of the cap member 41 contacting with an opening edge portion of the ferrule insertion hole 35 such that its outer diameter gradually increases toward a direction opposite to a side, of the cap member 41, at which the ferrule 33 is inserted.

In this manner, since the cap member 41 is fitted inside the ferrule insertion hole 35 in a state not contacting with the ferrule 33, the ferrule 33 can be surely protected.

Further, the cap member 41 has, at its side opposite to a side at which it is fitted inside the ferrule insertion hole 35, a convex portion 45 whose cross-section is smaller than that of the cap member 41.

The convex portion 45 is provided with a lock hole 46 penetrating in a direction approximately perpendicular to a direction along which the ferrule 33 engages inside the engagement hole 43 of the cap member 41. The lock hole 46 has an approximately rectangular sectional shape through which a tip portion of a strap member 42 can be inserted. Further, as described in detail below, the lock hole 46 is designed to lock the strap member 42.

Further, an end portion at an engagement hole 43 side of the cap member 41 is beveled at a predetermined angle. By this construction, the cap member 41 can be easily fitted into the ferrule insertion hole 35. Of construction, it is understood, however, that the beveling of the end portion of the cap member 41 can be omitted if desired.

As to a material used for the cap member 41, it is not limited especially so long as it is a thermoplastic or thermosetting resin material capable of being manufactured by injection molding. For example polyamide or polypropylene can be used as the material for the cap member 4.

Figure 4B:
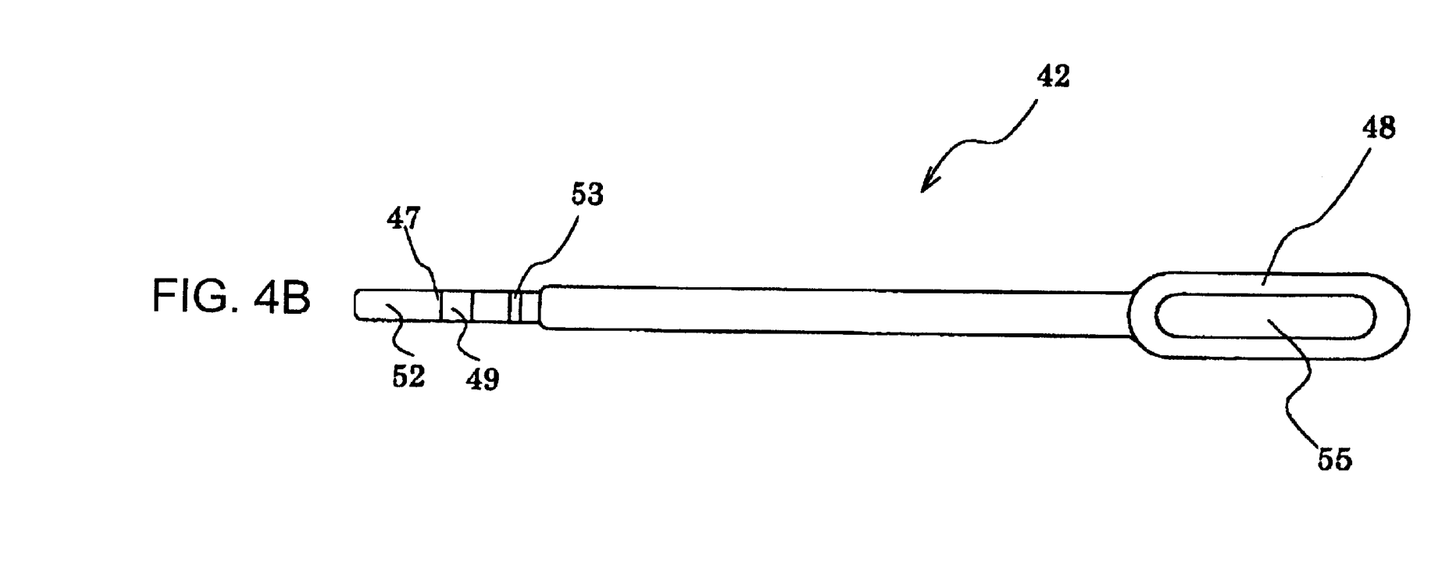
FIG. 4B is a plan view of the same.

Further, as shown in FIG. 4A and FIG. 4B, the strap member 42 locked to the cap member 41 is a long, band-shaped member having a predetermined thickness, an insertion portion 47 capable of being inserted through the lock hole 46 at its tip portion side, and a passage portion 48 for passing the optical fiber cord at its base end portion side.

Figure 5A:
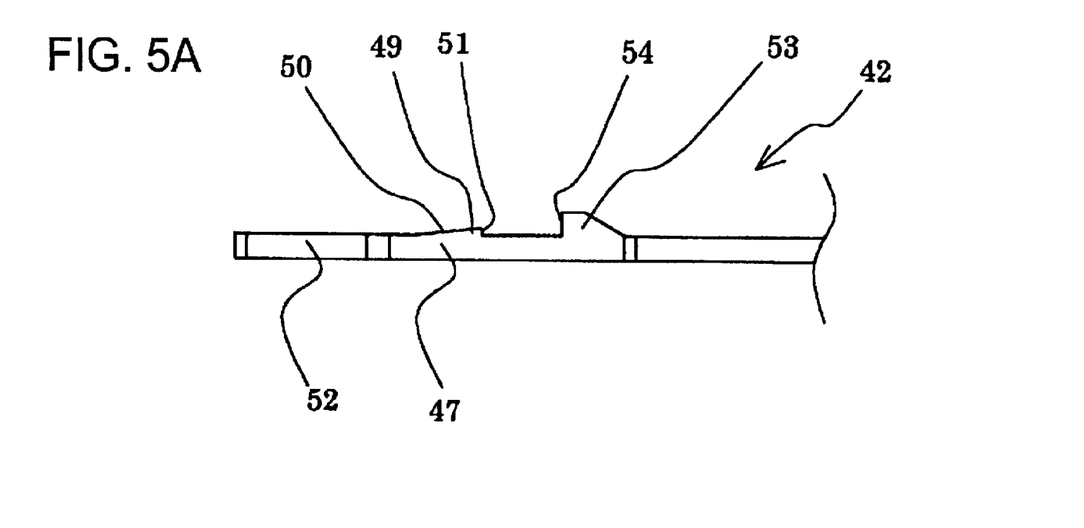
FIG. 5A is a main portion enlarged side view of the strap member according to the embodiment 1 of the invention.
Figure 5B:
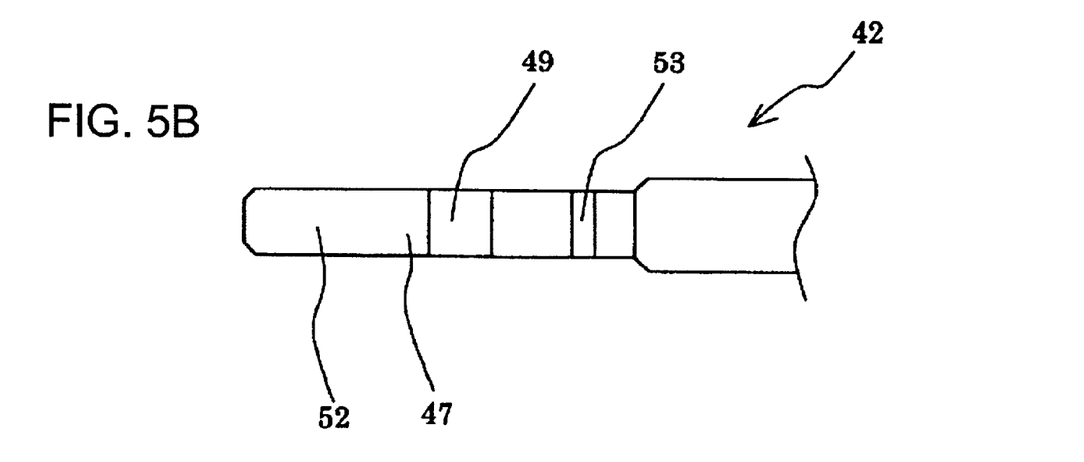
FIG. 5B is a main portion enlarged plan view of the same.

As shown in FIG. 5A and FIG. 5B, the insertion portion 47 is provided with an engagement protrusion 49 protruding in a thickness direction of the strap member 42. Incidentally, FIG. 5A is a main portion enlarged side view of the strap member according to this embodiment, and FIG. 5B a main portion enlarged plan view of the same.

The engagement protrusion 49 is provided at a predetermined position from a tip of the insertion portion 47, and has a slant portion 50 having a slant face whose thickness gradually increases from the tip portion of the strap member 42 toward the base end portion side and which has a predetermined angle, and a vertical portion 51 having a face approximately perpendicular to a thickness direction of the insertion portion 47. The engagement protrusion 49 has a shape adapted for insertion into the lock hole 46 of the cap member 41. The vertical portion 51 of the engagement protrusion 49 abuts against an outer edge portion of the lock hole 46 in an inserted state so that the insertion portion 47 cannot be disengaged easily from the lock hole 46 of the cap member 41.

Further, a tip portion side of the insertion portion 47 from the engagement protrusion 49 becomes a pinching portion 52. The pinching portion 52 is one for pulling the insertion portion 47 by pinching its tip when the insertion portion 47 is inserted through the lock hole 46 and the engagement protrusion 49 is passed through the engagement hole 46. That is, by pulling the pinching portion 52 in a direction along which the insertion portion 47 comes out from the lock hole 46, the engagement protrusion 49 can be easily passed through the engagement hole 46.

Additionally, at a base end portion side from the engagement protrusion 49 of the insertion portion 47, there is provided an abutment portion 53 having an abutting face 54 mutually opposing to the vertical portion 51 of the engagement protrusion 49 with a predetermined spacing. The abutment portion 53 abuts against an outer end portion of the lock hole 46 by passing the insertion portion 47 through the lock hole 46 and pulling the pinching portion 52, thereby regulating an excessive insertion of the strap member 42. By this construction, after the engagement protrusion 49 has been passed by pulling the pinching portion 52, the abutting face 54 abuts against the outer end portion of the lock hole 46, so that the tip of the strap member 42 is prevented from being excessively pulled out from the lock hole 46.

In this manner, by providing the engagement protrusion 49 and the portion 53, it becomes possible to simply pass the insertion portion 47 through the lock hole 46, and the insertion portion 47 can be comparatively easily locked to the lock hole 46.

Figure 5C:
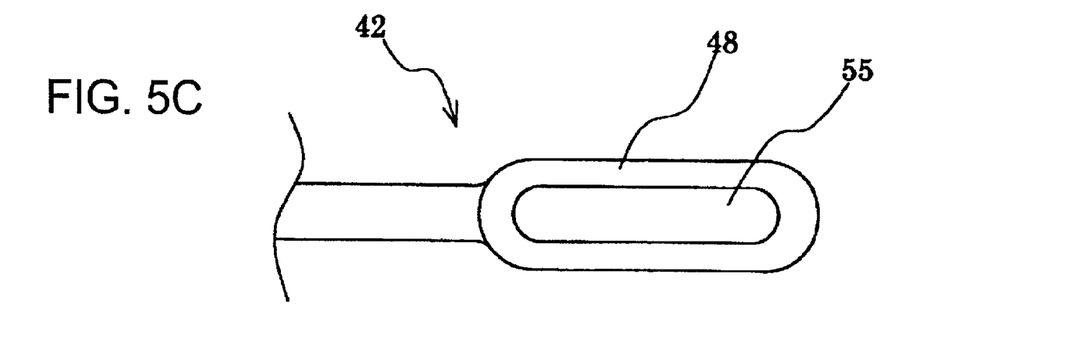
FIG. 5C is another main portion enlarged plan view of the same.

On the other hand, as shown in FIG. 5C, the passage portion 48 at the base end portion side of the strap member 42 has a shape protruding to both sides in a width direction. The passage portion 48 has a passage hole 55 penetrating in a thickness direction of the strap member 42. The passage hole 55 is an elongated hole extending along a longitudinal direction of the strap member 42.

After the optical fiber cord has been passed through the passage hole 55, the insertion portion 47 at a side opposite to the passage portion 48 is locked to the cap member 41. By this, even if the cap member 41 fitted to the ferrule insertion hole 35 is separated, the cap member 41 can be prevented from being lost because the optical fiber cord has been passed through the passage hole 55.

The material selected for the strap member, 42 it is not limited so long as it is a material which is comparatively flexible in comparison with the cap member 41 and which is capable of being injection-molded for example rubber and a thermoplastic elastomer can be used for the strap member 42. Preferably, polyurethane, amide-based elastometers and the like are used because they have excellent in flexibility.

(Other Embodiments)

In the above, the embodiment 1 of the invention has been described, but the protecting cap is not limited to one mentioned above.

In the embodiment 1 mentioned above, the engagement protrusion 49 is provided so as to protrude in the thickness direction of the insertion portion 47, but it is not limited to this especially, and it may be provided so as to protrude to both sides in a width direction of the insertion portion 47. Further, also the butting portion 53 may be provided so as to similarly protrude to both sides in the width direction of the insertion portion 47.

Figure 6A:
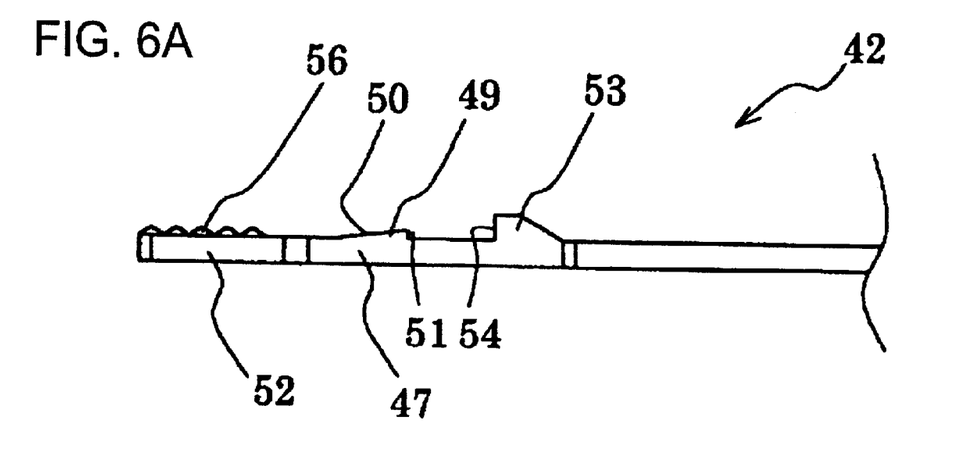
FIG. 6A is a main portion enlarged side view of the strap member according to other embodiment of the invention.
Figure 6B:
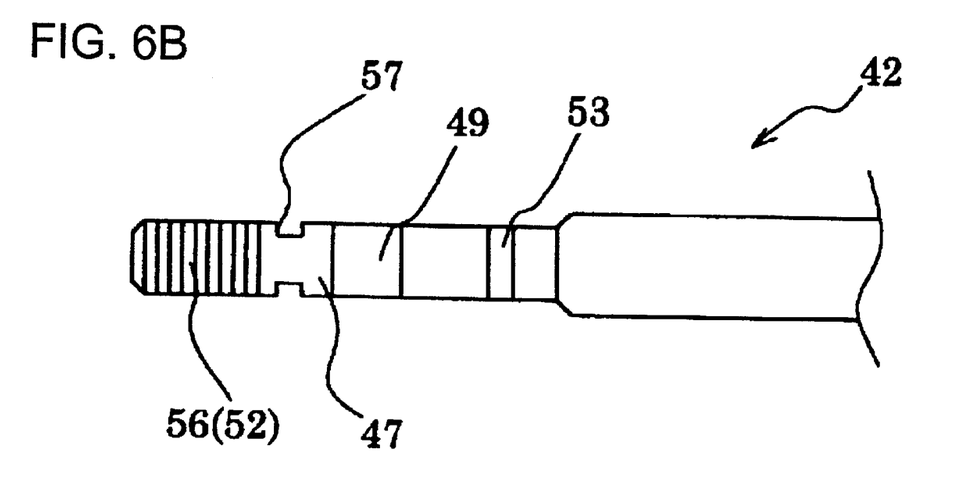
FIG. 6B is a main portion enlarged plan view of the same.

Further, as shown in FIG. 6A and FIG. 6B, the pinching portion 52 passed through the engagement hole 46 by pulling the tip of the insertion portion 47 may be provided with a slip prevention portion 56 on at least one surface of the pinching portion 52. Incidentally, FIG. 6A is a main portion enlarged side view of the strap member according to this other embodiment, and FIG. 6B a main portion enlarged plan view of the same.

The slip prevention portion 56 is formed by being made into a concave/convex form such as a striped pattern simultaneously with when the strap member 42 is formed by the injection molding. Incidentally, the slip prevention portion 56 may be formed by a blast working for instance after the strap member 42 has been injection-molded. In this manner, by providing the slip prevention portion 56 in the pinching portion 52, a slip occurring when passing the insertion portion 47 provided with the engagement protrusion 49 through the lock hole 46 of the cap member 41 can be prevented.

Additionally, in order to cut out the pinching portion 52 protruding from the cap member 41 after the strap member 42 has been locked to the lock hole 46, a thin-walled portion where a thickness of the strap member 42 has been reduced be provided between the pinching portion 52 and the engagement protrusion 49. In this manner, by providing the thin-walled portion 57 in the chipping portion 52, the excess chipping portion 52 can be easily cut out, so that a beautiful spectacle can be improved. Of course, it is needless to say that, even in case where there is no thin-walled portion 57, the strap member 42 may be used with the chipping portion 52 being cut.

Additionally, in the embodiment 1 mentioned above there has been exemplified and described the SC type optical fiber connector plug 10 as the optical fiber connector plug to which the protecting cap 40 is mounted, but it is not limited to this especially. The protecting cap 40 of the invention may be mounted to such an optical fiber connector plug as FC type, LC type and MU type for instance. Incidentally, the LC type optical fiber connector plug is a type in which the ferrule is directly mounted to the plug housing without using the plug frame. Therefore, in this case, the protecting cap can protect the end face of the ferrule by the fact that it fits to a tip opening portion of the plug housing.

According to the invention, since the protecting cap is divided into the cap member and the strap member, an optimum material can be selected in compliance with a used mode of each of them. That is, since the cap member protects the end face of the ferrule in the non-contacting state, a comparatively hard material can be selected for it. Further, since the strap member is elastically deformed, a comparatively flexible material allowing an elastic deformation can be selected for it. Additionally, since each of them can be formed by the injection molding, a manufacturing time can be shortened and a manufacturing cost can be reduced. Of course, as to the protecting cap of the invention, it is possible to use only the cap member in compliance with a use.

What is claimed is:

1. An optical fiber connector plug protecting cap for mounting to an optical fiber connector plug having a ferrule with an insertion hole into which an optical fiber is inserted and a holding member for holding the ferrule, the optical fiber connector plug protecting cap comprising: a tubular cap member made of a resin material and configured to be fitted to a tip opening of the holding member to cover a tip portion of the ferrule in a non-contacting state, and a strap member having first and second end portions and comprised of an elastic body having a relatively greater flexibility than the cap member, the cap member having a connecting part having a locking hole for locking the first end portion of the strap members, the first end portion of the strap member having an engagement protrusion for engagement with the locking hole in a state in which the first end portion extends through the locking hole, and the engagement protrusion of the strap member having a deformable portion configured to be deformed so that the engagement protrusion is locked to an edge portion of the connecting part of the cap member near the locking hole.

2. An optical fiber connector plug protecting cap according to claim 1; wherein the second end portion of the strap member has a passage hole for receiving therethrough the optical fiber.

3. An optical fiber connector plug protecting cap set according to claim 1; wherein the strap member has an abutment portion disposed at a side opposite to a side of the strap member on which the deformable portion is disposed for abutment against the edge portion of the connecting part of the cap member.

4. An optical fiber connector plug protecting cap according to claim 1; wherein the locking hole is formed in an end portion of the cap member at a side thereof opposite to an insertion side of the ferrule.

5. An optical fiber connector plug protecting cap according to claim 4; wherein the cap member has a protrusion having a cross-section is smaller than that of other portions of the cap member.

6. An optical fiber connector plug protecting cap according to claim 1; wherein at least one surface of the deformable portion has a slip prevention portion.

7. An optical fiber connector plug protecting cap according to claim 1; wherein the strap member has thin-walled portion disposed between the deformable portion and the engagement protrusion.

8. An optical fiber connector plug protecting cap according to claim 1; wherein the strap member is made of an elastomer or rubber material.

9. An optical fiber connector plug protecting cap according to claim 1; wherein the optical fiber connector plug comprises one an FC-type, an SC-type, an LC-type, and an MU-type optical fiber connector plug.

* * * * *